United States Patent
Göpfrich et al.

[11] Patent Number: 5,905,643
[45] Date of Patent: May 18, 1999

[54] METHOD AND CIRCUIT ARRANGEMENT FOR SHAPING A.C. VOLTAGE

[75] Inventors: Kurt Göpfrich, Erlangen; Olaf Hädrich, Chemnitz, both of Germany

[73] Assignee: Siemens Aktiengesellschaft, Munich, Germany

[21] Appl. No.: 09/035,499

[22] Filed: Mar. 5, 1998

[30] Foreign Application Priority Data

Mar. 10, 1997 [EP] European Pat. Off. .............. 97103946

[51] Int. Cl.[6] ..................................................... H02M 1/12
[52] U.S. Cl. .................................. 363/41; 363/79; 363/98
[58] Field of Search .................................. 363/34, 37, 39, 363/40, 41, 45–48, 78, 79, 96, 97, 98, 131, 132

[56] References Cited

U.S. PATENT DOCUMENTS

| 4,670,827 | 6/1987 | Schneider .................................. 363/48 |
| 5,018,058 | 5/1991 | Ionescu et al. ............................ 363/34 |
| 5,793,623 | 8/1998 | Kawashima et al. .................. 363/37 X |

OTHER PUBLICATIONS

"A Simple Control Strategy for Shunt Power Line Conditioner with Inductive Energy Storage," Humberto Pinheiro et al., IEEE, Power Electronics, MAUI, Bd. 2, Nov. 15, 1993, pp. 1093–1098.

"A Novel Control of a Current Source Active Filter for AC Power System Harmonic Compensation," Yoichi Hayashi et al., Conference Record of the Industry Applications Society Annual Meeting (IAS), IEEE, Part 1, Oct. 2, 1988.

*Primary Examiner*—Peter S. Wong
*Assistant Examiner*—Y. J. Han
*Attorney, Agent, or Firm*—Kenyon & Kenyon

[57] ABSTRACT

A method and a circuit arrangement for shaping any actual a.c. voltage characteristic into any reference a.c. voltage characteristic are described, which store the excess power in voltage overshoots in the form of a current in a current storage device using power electronic switching elements, and thus they compensate for the power deficiency when there is a voltage shortfall. The power electronic switching elements are driven by a digital automatic state machine through appropriate control pulses so that there is no fixed switching rate. The preferred field of application is for active filtering of the voltage of an electric three-phase or a.c. power supply system.

12 Claims, 4 Drawing Sheets

METHOD AND CIRCUIT ARRANGEMENT FOR SHAPING A.C. VOLTAGE

FIELD OF THE INVENTION

The present invention relates to a method and a circuit arrangement for converting an actual a.c. voltage characteristic into a reference a.c. voltage characteristic.

BACKGROUND INFORMATION

In electrical engineering, the problem of converting an actual a.c. voltage into a desired reference a.c. voltage arises in many applications. Such applications may include, for example, power electronics, low-frequency electronics, communications electronics, etc.

The preferred field of application for such methods and circuit arrangements is filtering the voltage of an electric three-phase or a.c. power supply system which is strongly subject to voltage harmonics generated by power electronic equipment and arrangements due to the switching components. Conventional methods of filtering harmonics out of line voltages have involved only methods and arrangements based on passive electronic components. Active methods and circuit arrangements for shaping and filtering a.c. voltage have been used only for filtering harmonics out of line currents.

Since only filters with passive electric components have been used to suppress voltage harmonics, a method of shaping a.c. voltage and a suitable circuit arrangement for this purpose based on active electronic components are to be created so that costs and high losses in passive filters can be reduced.

This principle should theoretically be capable of converting any desired a.c. voltage form to any other a.c. voltage form at a power supply connection point. The field of application of this method and circuit arrangement should thus be expandable to a great extent into areas that are far from being limited to just electric supply systems, power electronic loads or the elimination of harmonics.

SUMMARY OF THE INVENTION

An object of the present invention is to provide for a method and a circuit arrangement that can be used for any voltage levels and frequencies for shaping an a.c. voltage of an actual a.c. voltage characteristic to obtain a reference a.c. voltage characteristic.

According to the present invention, this object is achieved by a method including the following steps:

1.1 electric energy contained in deviations in the actual a.c. voltage characteristic from the reference a.c. voltage characteristic is supplied to a current storage device when there is a voltage overshoot and supplied by the current storage device when there is a voltage shortfall;

1.2 converter valves are driven as a function of a voltage overshoot or a voltage shortfall, so that there is no fixed frequency rate, and control pulses are obtained;

1.3 at least one actual voltage value and one current flowing in the current storage device are determined;

1.4 the actual voltage value(s) determined are processed, and reference voltage values corresponding to the voltage value(s) and are equal to the reference a.c. voltage characteristic are generated, 1.5 a factor is supplied for conditioning the reference voltage value(s) as a function of the current flowing in the current storage device;

1.6 the respective control pulses for the respective converter valves are made available on the basis of deviations of the conditioned reference voltage value(s) from the actual voltage value(s) using logic operations.

In this way, an adjustment of any given a.c. voltage form to any other desired a.c. voltage form can be achieved, with only a small amount of harmonics being generated by high switching frequencies. In addition, the spectrum of the actual voltages is noisy, so that no point of resonance occurs near the switching frequency.

A first advantageous exemplary embodiment of the process according to the present invention includes an additional process step:

2.1 at least one positive converter valve and one negative converter valve are always turned on at the same time.

This achieves the result that the current flowing in the current storage device is not choppy and the resulting overvoltage does not destroy the converter valves.

In another advantageous exemplary embodiment of the method according to the present invention, it is also guaranteed that the current present in the current storage device does not exceed a maximum value, so that the current storage device always remains in a linear operating range. This is achieved through an additional process step:

3.1 the current flowing through the current storage device is monitored to detect whether it exceeds a maximum allowed current, and if it is out of range, the current flowing through the current storage device is limited by an increase in the factor for conditioning.

Yet another advantageous exemplary embodiment of the method according to the present invention also achieves the result that when there is a further increase in current in the current storage device, this current can be rapidly reduced to a sufficient extent. This is accomplished through an additional process step:

4.1 if the maximum allowed current in the current storage device is greatly exceeded, the control pulses for the converter valves are inverted or two complementary converter valves are activated at the same time.

Yet another advantageous exemplary embodiment of the method according to the present invention also achieves the result that a drop in operating voltage is detected and a response is initiated so promptly that a current available in the current storage device is compensated before an outage or a shutdown to zero. This is accomplished through an additional process step:

5.1 if the operating voltage drops below a minimum allowed level, two complementary converter valves are switched on at the same time.

In a further advantageous exemplary embodiment of the method according to the present invention, an especially advantageous possibility is created for generating reference voltage values that are phase-locked with the actual a.c. voltage characteristic. This is accomplished through an additional process step:

6.1 for generation of appropriate reference voltage values, the corresponding actual voltage values are smoothed, rotated by a fixed phase angle and differentiated by determining the zero passes of the actual voltage values with these phase-locked reference voltage values.

In another advantageous exemplary embodiment of the method according to the present invention, an especially advantageous possibility of storing excess power in the current storage device and supplying power from the current storage device to make up for a deficiency is provided. This is accomplished through additional process steps:

7.1 the actual a.c. voltage is supplied to an element or a group of elements for storing the a.c. voltage;

7.2 the excess energy stored in the element or group of elements when a voltage overshoot is stored temporarily in a d.c. storage element using an alternating current converted by the converter valves to a direct current, and in the event of a voltage shortfall the required power is supplied to the element or the group of elements.

An especially preferred area of application of the method according to the present invention is for active filtering of a.c. voltages, where the ideal undisturbed characteristic of the a.c. voltage is used as the basis of the reference a.c. voltage characteristic.

An especially preferred application in this regard is for filtering the voltages of an electric three-phase or a.c. power supply system which are highly subject to harmonics generated by power electronic equipment and arrangements due to the switching components. Here again, the ideal undisturbed characteristic of the a.c. voltage to be supplied by the a.c. power system is used as the basis of the reference a.c. voltage characteristic.

In addition, a circuit arrangement for shaping an actual a.c. voltage characteristic into a reference a.c. voltage characteristic is created according to the present invention and is suitable for carrying out the method presented above and thus also achieves the object of the present invention. Such a circuit arrangement has the same advantages as the method on which it is based, and is characterized by the following features:

10.1 at least one current storing device to hold electric energy contained in deviations of the actual a.c. voltage characteristic from the reference a.c. voltage characteristic in the event of a voltage overshoot and to supply this power in the event of a voltage shortfall;

10.2 converter valves which can be driven by respective control pulses as a function of a voltage overshoot or undershoot so that there is no fixed switching frequency rate;

10.3 means for determining at least one actual voltage value and one current flowing in a current storage device;

10.4 means for generating respective voltage references corresponding to the reference a.c. voltage characteristic by processing the actual voltage value(s) determined;

10.5 means for supplying a factor for conditioning the reference voltage value(s) as a function of the current flowing in the current storage device;

10.6 means for supplying the control pulses for the respective converter valves on the basis of deviations of the conditioned voltage reference value(s) from the actual voltage value(s) using logic operations.

An especially advantageous exemplary embodiment of the circuit arrangement according to the present invention includes an active filter, with the ideal undisturbed a.c. voltage characteristic being used as the basis for the reference a.c. voltage characteristic.

In another advantageous exemplary embodiment of the circuit arrangement according to the present invention, an active filter is provided for filtering the a.c. voltage of an electric three-phase or a.c. power supply system, with the individual active and passive electronic components being implemented by especially advantageous variants. This is accomplished since the current storing device is designed as an inductive storage, the converter valves are designed as transistors, and the means for generating voltage references, for supplying a conditioning factor and for supplying the respective control pulses are implemented as logic circuits and/or user-specified logic circuits and/or a suitably programmed microprocessor or signal processor.

The method and the circuit arrangement for active filtering of the voltages of an electric three-phase or a.c. power supply network also have the advantages that the filter current stored in the current storage device can be regulated, the harmonics above which the active filter is to be activated can be stipulated through suitable parameterization and dimensioning of the electronic components; automatic adaptation to single-phase or three-phase power supply networks used worldwide with regard to the voltage, frequency, direction of rotation (in three-phase systems) and operating mode (power supply mode or power recovery mode) is possible.

DETAILED DESCRIPTION OF THE INVENTION

Since a method and a circuit arrangement for shaping an actual a.c. voltage characteristic into a reference a.c. voltage characteristic according to the present invention can be applied especially advantageously to voltage filtering for an electric three-phase or a.c. power supply system, the following exemplary embodiments are described for this application. However, the method and the circuit arrangement for shaping any actual a.c. voltage characteristic into any reference a.c. voltage characteristic according to the present invention are equally suitable and advantageous in other applications of electronics and electrical engineering.

Therefore, in the following description of two advantageous exemplary embodiments, the first for the active filtering of the voltages of an a.c. power supply system (shown in FIGS. 1 and 3) and the second a three-phase electric power supply system (shown in FIGS. 2 and 4), the reference a.c. voltage characteristic is assumed to be the ideal undisturbed characteristic of the a.c. voltage of the a.c. power supply system or the three-phase power supply system.

Thus, a method and a respective circuit arrangement is described herein which stores excess power in the voltage overshoots (i.e., overshooting of the actual line voltage in comparison with a reference) using power electronic switching elements in the form of a current in an inductance, and replaces the power shortfall due to the voltage undershooting in the other phase(s). Since this concerns the field of the application of an active filter, the term "filter" is consistently used below for the method and the circuit arrangement according to the present invention. The filter presented here works on single-phase a.c. voltage systems (FIG. 1) and also on zero-component-free three-phase a.c. voltage systems (FIG. 2).

Figure 1:
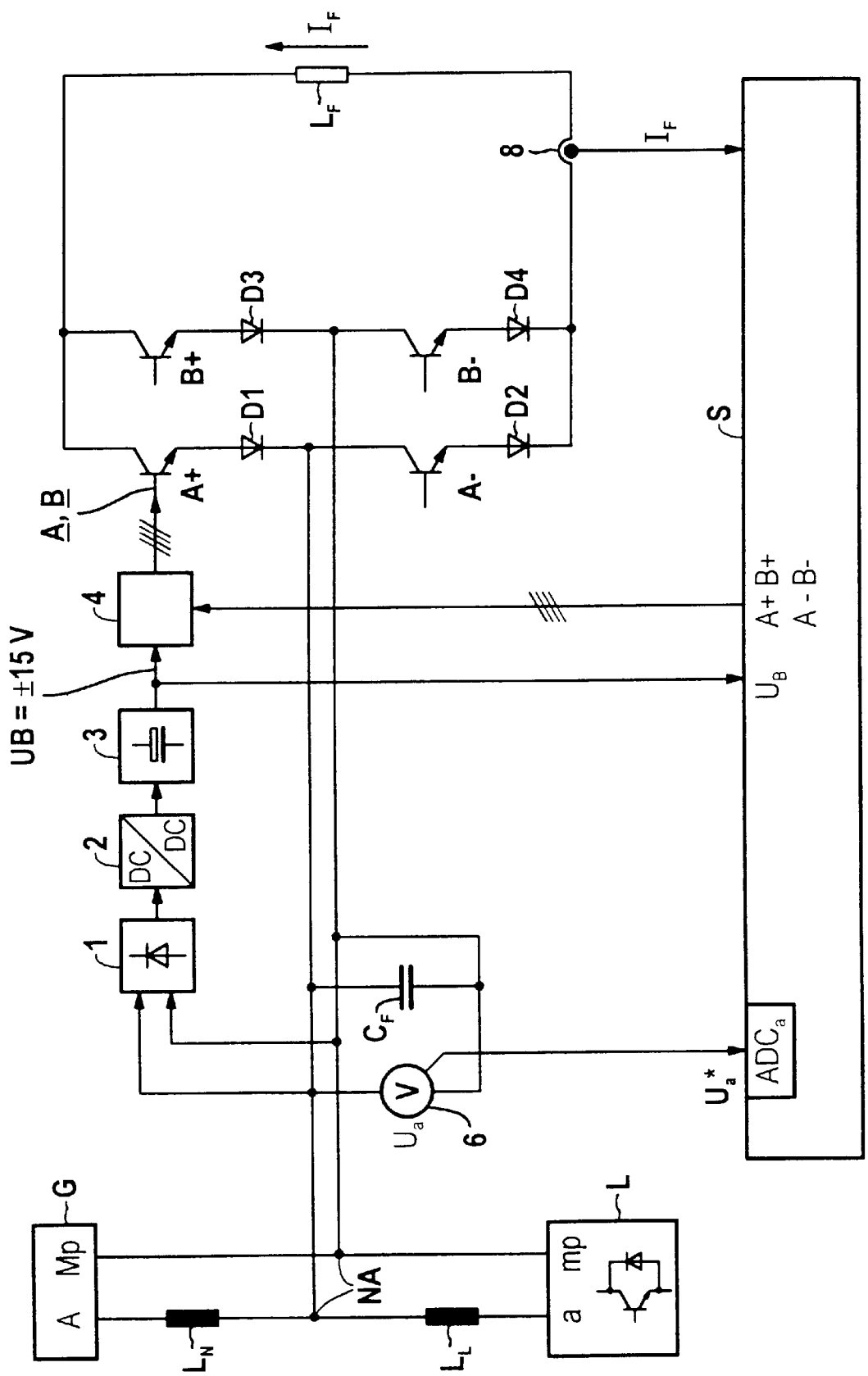
FIG. 1 shows a power part of an active filter for single-phase a.c. voltage systems.

A single-phase a.c. voltage system will have in general the structure shown in FIG. 1. One or more supply points for electric power, which are represented by generator G in the diagram in FIG. 1, are connected to a power supply connection point NA. The power supply connection point NA is a point at which the filter is connected to the power supply system. One or more load points L are connected to this point. In addition, an electric power supply system is characterized by parasitic and/or additional inductances which are designated as line inductance $L_N$ and load inductance $L_L$ respectively in the diagrams in FIG. 1. These inductances decouple the voltages at the power supply connection point NA with respect to the supply points G and the load points L. This permits a voltage form at power supply connection point NA which deviates from those before or after it. For the single-phase a.c. voltage system shown in FIG. 1, the line inductance $L_N$ in a line phase A is located on the generator side G, while the load inductance $L_L$ is located on the load side L with the phase labeled as a. The second phase, the directly grounded conductor, present in the single-phase a.c. voltage system is labeled as mp on the load side L and as Mp on the generator side G.

Figure 2:
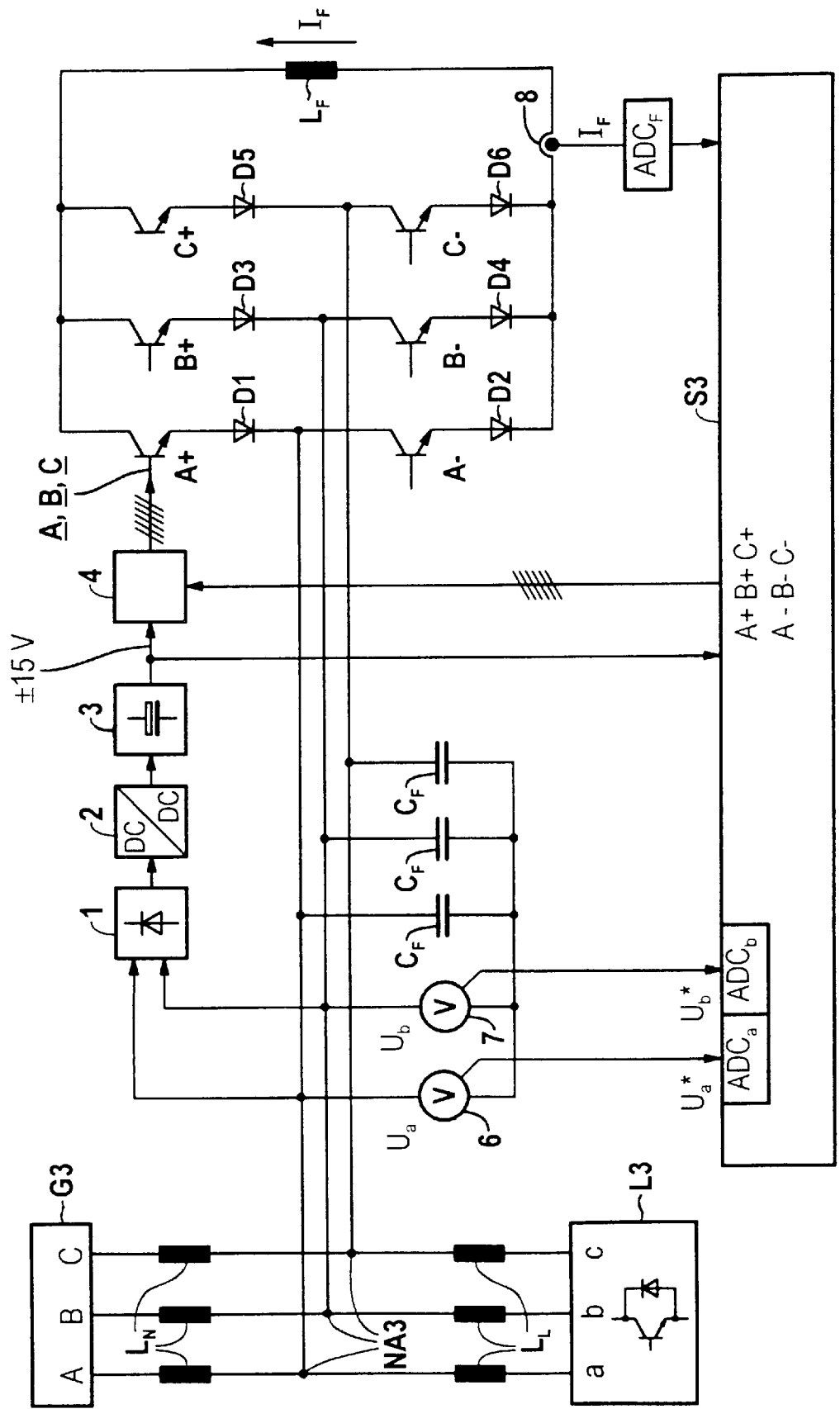
FIG. 2 shows a power part of an active filter for three-phase a.c. voltage systems.

The three-phase a.c. voltage system shown in the diagram in FIG. 2 is free of zero components and differs from that shown in FIG. 1 only in the three phases A, B and C emanating from a three-phase generator G3, each with line inductances $L_N$, and on load side L3, the load inductances $L_L$ corresponding to the phases labeled there as a, b and c. In the diagram in FIG. 1 for the single-phase a.c. voltage system, the power supply connection NA is at the two phases A, Mp and a, mp, but the power supply connection NA3 in the diagram in FIG. 2 is connected to the three phases A, B, C and a, b, c for a three-phase a.c. voltage system.

If electricity flows on an average from supply points G and G3 to load points L and L3, this mode is referred to as the "power supply mode" of the power supply system. The reverse case is referred to as "power recovery mode." In addition, a matrix of all actual line voltage vectors is referred to below as $U=(U_a)$ in single-phase systems and $U=(U_a, U_b, U_c)$ in three-phase systems, and the matrix of all reference line voltage vectors is referred to as $U_{ref}=(U_{ref})$ in single-phase systems and $U_{ref}=(U_{aref}, U_{bref}, U_{cref})$ in three-phase systems.

The actual voltages U present at the power supply connection point NA or NA3 are usually such that the absolute values of their instantaneous values differ from the absolute values of the instantaneous values of the desired reference voltages $U_{ref}$. The matrix of vectors of the deviations is designated by $\Delta U=(\Delta U_a)$ in single-phase systems and by $\Delta U=(\Delta U_a, \Delta U_b, \Delta U_c)$ in three-phase systems. A positive deviation in a voltage $\Delta U=U_{ref}-U>0$ is referred to as a voltage shortfall, and a negative deviation in a voltage $\Delta U=U_{ref}-U<0$ is referred to as a voltage overshoot.

The filter includes a group of elements for storing the line voltage, which are advantageously designed as capacitors. These are referred to below as $C_F$. Thus the actual line voltage U drops across these capacitors $C_F$. For the single-phase a.c. voltage system shown in the diagram in FIG. 1, a capacitor $C_F$ connected between the power supply connection point NA is thus needed, and for the three-phase a.c. voltage system shown in the diagram according to FIG. 2, three capacitors $C_F$ are thus connected accordingly between line phases A, B, C and a, b, c at power supply connection point NA3 in a star connection. The excess power stored during the line voltage overshoots and the power shortfall during the line voltage undershoots is then compensated by a single-phase a.c. current in the case of single-phase systems, or in three-phase systems an undershoot is compensated by a three-phase a.c. current which is converted to a direct current $I_F$ by power electronic switching elements and is stored temporarily in a d.c. storage element, preferably an inductive current storage device $L_F$.

The power electronic switching elements and converter valves provided include, for example, two complementary transistors A+, A– and B+, B– which are assigned to each phase plus C+, C– for the three-phase system. A diode D1 to D6 is connected downstream from and in series with each of these converter valves A+, A–, B+ . . . on the emitter side, serving to protect the transistors from negative collector-emitter voltage $U_{CE}$. These diodes D1 to D6 cause a current $I_F$ to always flow only in one negative branch and in one positive branch. This direct current is referred to below as filter current $I_F$, and the d.c. storage element is the filter inductance $L_F$. Filter inductance $L_F$ thus serves as a power storage device for the voltage-time areas between U and $U_{ref}$. It is especially advantageous if the filter inductance has a linear characteristic. It is designed according to the use and the harmonic of the filter to be taken into account.

Each complementary circuit of converter valves A+, A–, B+, B– in single-phase systems and A+, A–, B+, B–, C+, C– in three-phase systems is connected, via the power supply connection point NA or NA3 at the respective line phase, to the respective connection point of the complementary converter valves. The filter inductance $L_F$ is connected between the converter valves A+, B+ . . . of the positive branch, which are connected on the collector side, and the converter valves A–, B–, . . . of the negative branch, which are connected on the emitter side. The transistors used as converter valves guarantee commutation of the filter current $I_F$ and thus the reduction of voltage overshoots and compensation of voltage shortfalls. Fast IGBTs (IGBT=insulated gate bipolar transistor) or MOSFETs (MOSFET=metal oxide semiconductor field effect transistor), for example, may be used as the transistors. Any antiparallel emitter-collector diodes that might be present, as is conventional with power transistors, do not cause interference. The matrix of the control pulses corresponding to the converter valves A+, A–, B+, . . . is designated as (A, B) with single-phase systems according to the diagram in FIG. 1 and as (A, B, C) with three-phase systems according to the diagram in FIG. 2. Such control pulses are supplied by a driver 4 which is driven by a control part S or S3, to be explained in greater detail below. The fact that only four control pulses are needed for the four converter valves A+, A–, B+, B– in single-phase a.c. voltage systems, as shown in FIG. 1, is illustrated by a corresponding labeling of the signal emitted by driver stage 4. Only the control signal for the converter valve A+ is shown. For the three-phase a.c. voltage system, as shown in the diagram in FIG. 2, six control pulses are needed for the six converter valves A+, A–, B+, B–, C+, C– accordingly, which is also illustrated by a corresponding designation of the signal emitted by the driver stage. Only the control signal for the converter valve A+ is shown.

Operating voltage $U_B$ for the driver stage 4 and for the control part S or S3, which is described in greater detail below, is supplied by deriving a direct voltage through appropriate function elements 1, 2, 3 from at least two phases of the a.c. voltage or three-phase system. The function stages may include, for example, a rectifier 1, a voltage transformer 2 and a stabilizing capacitor 3. All methods and devices for deriving a direct voltage with which those skilled in the art are otherwise familiar can also be used in the same manner.

With a voltage overshoot ($U>U_{ref}$) in one or two phases (i.e., a voltage shortfall in at least one other phase), valve(s) A–, B– or C– of the phase(s) with a voltage overshoot, and valve(s) A+, B+ or C+ of the phase(s) with a voltage shortfall is/are permanently switched on. The power supplied during the voltage overshoot is stored in the filter inductance $L_F$ and the voltage shortfalls are compensated by the current flow $I_F$ through the converter valves A−, B−, C−, the filter inductance $L_F$, A+, B+, C+. A voltage deviation $\Delta U_a$ with the single-phase systems and the ratios of the voltage deviations $\Delta U_a$, $\Delta U_b$, $\Delta U_c$ to one another in the three-phase systems define a voltage state. There are two relevant voltage states with the single-phase systems and six with the three-phase systems. Each such voltage state $\Delta U$ is unambiguously allocated a switching state of the converter valves (A, B) in the single-phase systems or (A, B, C) in the three-phase systems.

For adapting the prevailing actual a.c. voltage characteristic U at the power supply connection point NA or NA3 to the desired reference a.c. voltage characteristic $U_{ref}$, a suitable device, which is referred to below as the control part S or S3 in the case of the three-phase systems, the controls converter valves A+, A−, B+, ... by generating the suitable control pulses (A, B) in the single-phase systems or (A, B, C) in the three-phase systems. These control pulses are generated so that the respective switching state (A, B) or (A, B, C) is calculated as a function of the prevailing voltage state $\Delta U$ and the corresponding converter valves are switched on or off.

Such a control part S is shown as a block in the diagram in FIG. 1 for the single-phase a.c. voltage systems. Details of the control part S are shown in the diagram in FIG. 3. The control part labeled as S3 for the power part for the three-phase a.c. voltage systems shown in the diagram in FIG. 2 is specified further in the diagram in FIG. 4.

First, the change from one switching state to another is triggered by a change between two voltage states. Second, to maintain minimum switching times of the converter valves, the minimum switching time $T_{min}$, which depends on the maximum allowed frequency rate $f_{max}$ of the converter valves, is taken into account. The change between two switching states takes place when there is a change in voltage states $\Delta U$ and also the minimum switching time $T_{min}$ has elapsed since the last switch-over.

Since the actual a.c. voltage characteristic U contains noise, a change in voltage states is a quantity subject to a random factor. Thus the change in switching states is also subject to a random factor. For this reason, there is no fixed switching frequency rate of the converter valves in the system, which is why there is no additional point of resonance near the operating frequency in the spectrum of U. In this range, the spectrum is noisy with low amplitudes. Since there is a wait period $T_{min}$ at each switching state, the converter valves have a pulse-duty factor of approx. 0.5 (depending on the randomness of the actual a.c. voltage characteristic U). This permits a further increase in the maximum allowed switching frequency $f_{max}$ of the converter valves and thus an improvement in the quality of U.

Figure 3:
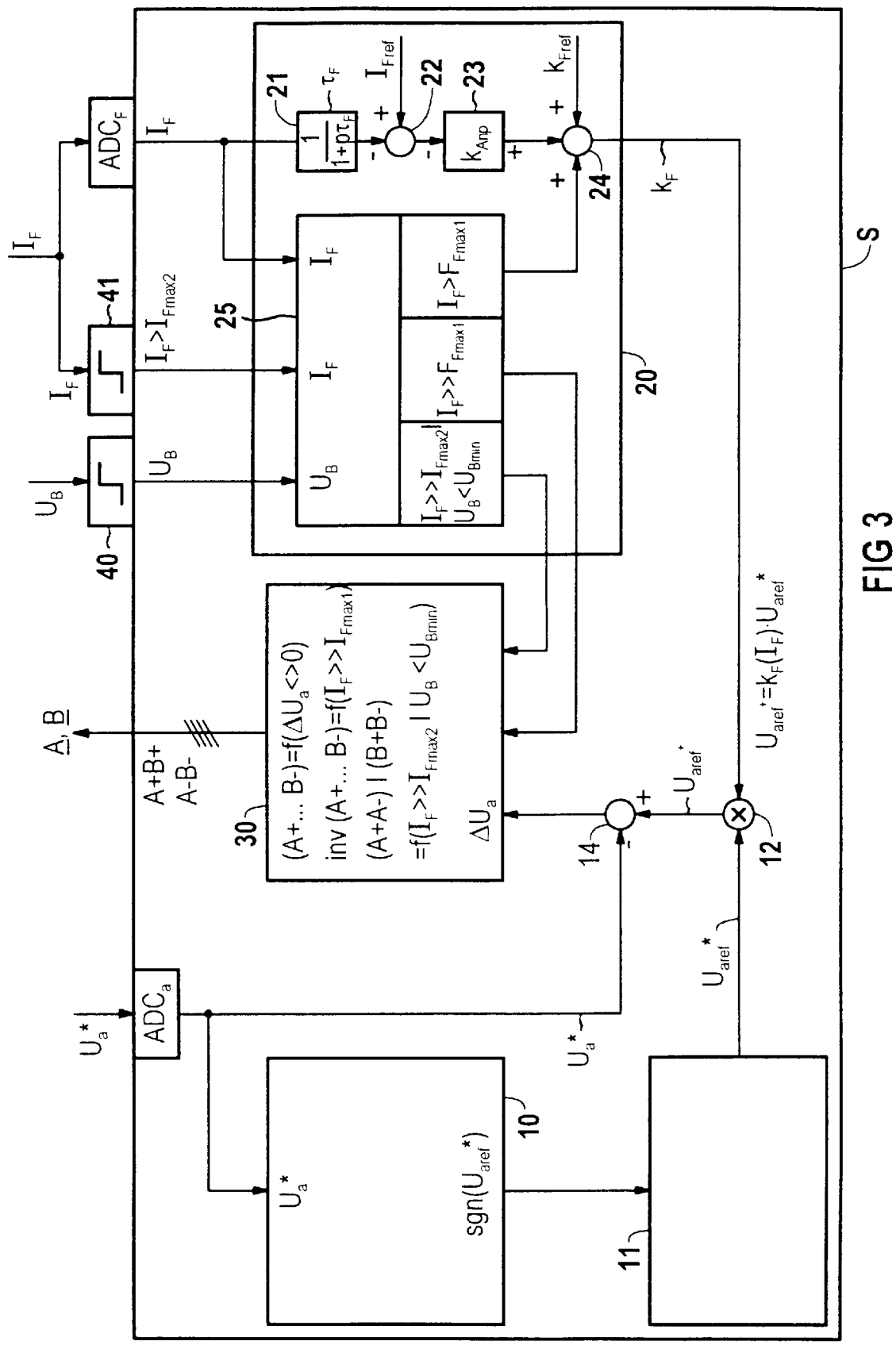
FIG. 3 shows a control part of the active filter for the single-phase a.c. voltage systems.
Figure 4:
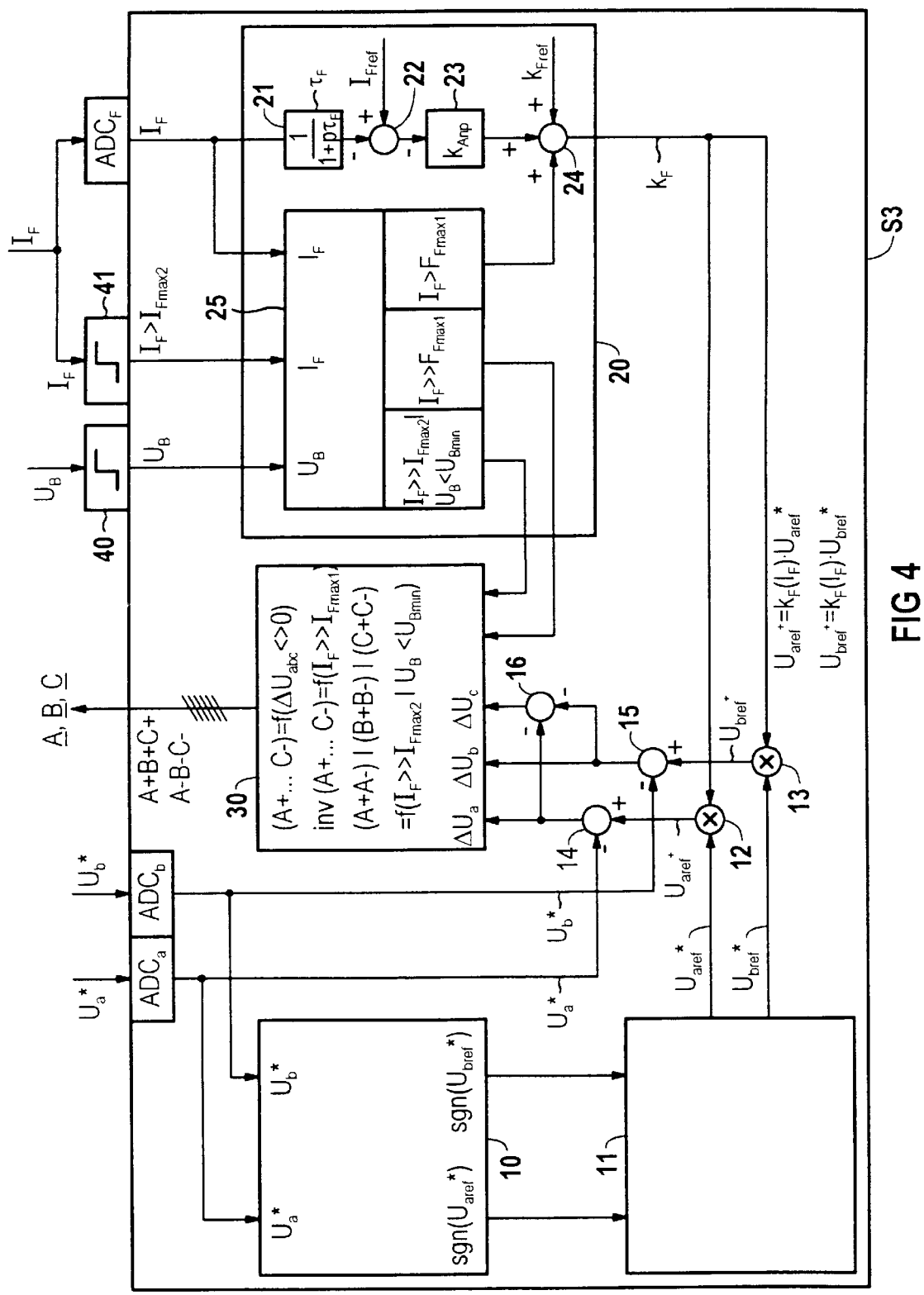
FIG. 4 shows a control part of the active filter for the three-phase a.c. voltage systems.

The control part S shown for the single-phase system in the diagram in FIG. 3 and S3 shown for the three-phase system in FIG. 4 implements such an automatic state machine. This ensures that in contrast with the usual controls of power electronic switches, at least two converter valves A+, A−, B+, ... are on at the same time during each change in the switching state ($I_F$ commutation from one pair of converter valves to the next).

To determine the prevailing actual voltage state, first the actual voltages $U^*=(U^*_a)$ in the single-phase systems or $U^*=(U^*_a, U^*_b)$ or two other phase voltages in the three-phase systems must be measured and digitized. In the single-phase systems in the diagram according to FIG. 1, voltage $U^*_a$ can be measured directly using capacitance $C_F$. In the diagram according to FIG. 1, this is accomplished by a voltage measuring unit 6, specifically a voltmeter. With the three-phase systems according to the diagram in FIG. 2, there is the possibility of measuring two or three actual voltages as phase voltages ($U^*_a$, $U^*_b$) based on a virtual star point. This method can be used preferentially with a star connection of the three filter capacitances $C_F$. Such a procedure is also selected in the diagram in FIG. 2, in that phase voltages $U^*_a$, $U^*_b$ are measured by two voltage measuring units 6 and 7, in particular voltmeters. On the other hand, the three filter capacitances $C_F$ can also be wired in a delta connection. Then only two phase-to-phase voltages, phase voltages $U^*_{ab}$ and $U^*_{bc}$, can be measured. These must then be converted into a system of phase voltages via a computation stage according to following equations:

$$|U_a|=-(2|U_{ab}|U_{bc}|)3 \text{ and } |U_b|=(|U_{ab}|+2|U_{bc}|)/3$$

Analog-digital converters $ADC_a$ and $ADC_b$ are provided for digitization. For adjusting the filter to the system conditions, filter current $I_F$ flowing in filter inductance $L_F$ is also measured by a current measuring unit and digitized using another analog-digital converter $ADC_F$. Such a current measuring unit 8, specifically an ammeter, is shown in the diagrams of the power part in FIGS. 1 and 2.

For an adjustment of the matrix of the measured actual voltages U to reference voltages $U_{ref}=(U^*_{eref})$ in the single-phase systems or $U_{ref}=(U^*_{aref}, U^*_{bref})$ in the three-phase systems, the phase angle $\phi$ ($U^*_a$) or $\phi$ ($U^*_a$, $U^*_b$) must be determined with regard to synchronous operation, with $\phi$ denoting the vector of the absolute angle with respect to a higher-order time base. Therefore, the measured actual voltage values $U^*_a$ ... must first be smoothed through a suitable arrangement so as to yield a precisely defined phase lag $\phi$. One possible procedure for doing so is to first smooth the actual voltage values $U^*_a$ ... sufficiently well through a PT1 element. Only the phase lag $\phi$ caused by the PT1 element is important, but the damping of the amplitudes is irrelevant. The time constant of the PT1 element should be selected so that $\phi$ is defined exactly as an integral multiple of 30°.

This smoothed signal is sent to a threshold switch which determines only the sign of the voltage. The period (frequency) and the phase sequence of the three-phase system can be obtained from the rectangular signals thus generated, which are phase-shifted by 120° in three-phase systems. By intelligent allocation of the phases among one another, the system is guaranteed to be in-phase. From this smoothed signal, the phase angle $\phi$ ($U^*_a$) or $\phi$ ($U^*_a$, $U^*_b$) is determined by recognition of the zero crossings. The resulting time function corresponds to the sign sgn (plus or minus sign) of the reference voltages sgn ($U_{aref}^*$) in single-phase systems and sgn ($U_{aref}^*$), sgn ($U_{bref}^*$) in three-phase systems.

The sign of the reference voltages sgn ($U_{aref}^*$) ... serves as a trigger signal for supplying a function $U_{ref}=(U_{aref}^*)$ in the single-phase systems or $U_{ref}=(U_{aref}^*, U_{bref}^*)$ of voltage references which correspond to the actual voltage values $U^*_a$ ... and which are exactly equal to the actual voltage values $U^*_a$ ... with regard to the frequency position and phase angle $\phi$. If needed, an additional phase angle may also be taken into account here. The amplitude of the reference a.c. voltage characteristic $U_{ref}$ is normalized to the unit amplitude. The reference a.c. voltage characteristic $U_{ref}$ has the desired shape and is free of distortion.

Smoothing of the measured actual voltage values $U^*_a \ldots$ with a precisely defined phase angle φ and the stipulation of the zero passes on the basis of the sign of the reference voltages sgn take place in a circuit element 10, which can be assembled discretely in the form of logic circuits or may also be implemented by a suitably programmed ASIC (application-specific IC) or by a suitably programmed microprocessor or digital signal processor.

A function generator 11 is driven by sign signals sgn $(U_{aref}^*) \ldots$ The function generator 11 may also be a function sequence stored in a memory area of a digital signal processor or microprocessor. In the present application of the exemplary embodiment, the amplitudes of a quarter period of the desired voltage signal (here: sine function) are stored digitally. The rectangular signals corresponding to the sign of the reference voltage sgn $(U_{aref}^*) \ldots$ serve as trigger points for cyclic polling of the memory for stipulation of the voltage references for one phase $U_{aref}^*$ in single-phase systems and of two phases $U_{aref}^*$ and $U_{bref}^*$ in three-phase systems.

The filter inductance $L_F$ must store as filter current $I_F$ the energy in the difference in the voltage-time areas between actual a.c. voltage characteristic U and reference a.c. voltage characteristic $U_{ref}$. An $I_F$ excess stands for an actual voltage value that is too large, an $I_F$ deficiency stands for an actual voltage value that is too small. The increase in the filter current $I_F$ is thus also a measure of the voltage level of the system. The voltage difference ΔU is caused by the voltage harmonics present, but it is also a function of the mode of the system at that moment (i.e., whether it is in the power supply mode or power recovery mode). In the power supply mode, there is a lower voltage level at the power supply connection point NA or NA3 in relation to the feed points of generator G or G3. In power recovery mode, the voltage level at the power supply connection point NA or NA3 rises in relation to the feed point(s). The filter current $I_F$ is thus a measure of these voltage differences ΔU.

In a processing unit 20, which may be implemented in the same way as the processing unit 10, a factor $k_F$ is determined for reference conditioning. To do so, the measured filter current I. is digitized by the analog-digital converter $ADC_F$ and smoothed over a delay element 21 with time constant $I_F$, where $τ_F$ is a function of the cut-off frequency $f_F$ of the filter, where $τ_F=1/f_F$. When $τ_F$ is large, even VLF harmonics are still taken into account by the filter. However, this increases the filter current $I_F$ (and thus also the inductance $L_F$). When $τ_F$ is smaller, LF harmonics cannot be corrected, and instead lower filter currents $I_F$ flow. In this way the filter cut-off frequency $f_F$, above which the filter properties become operative can be stipulated to adjust the filter properties to the conditions of the power supply connection point NA or NA3 with respect to the harmonic to be taken into account. Thus, the quality of the regulated voltage U can be determined with $f_F$.

To protect the components of the filter from an excessively high filter current $I_F$ using a suitable control method or suitable control equipment, the filter current $I_F$ is compared with a reference filter current $I_{Fref}$. The desired average filter current can be set with $I_{Fref}$. Since the filter current $I_F$ is a measure of the quality of the filter, a small $I_{Fref}$ is possible only if LF harmonics are not to be filtered. The resulting difference $ΔI_F=I_{Fref}-I_F$ is inverted. A conditioning factor $k_F$ is formed from $-ΔI_F$. These operations are performed using blocks 22, 23, and 24. Using conditioning factor $k_F$, the unconditioned voltage references $U_{ref}$ generated in function generator 11 are conditioned by multiplying by conditioning factor $k_F$: $|U_{ref}^*|=k_F|U_{ref}^*|$. It holds for $ΔI_F=0$ that $k_F=1$, i.e., the generated amplitude $|U_{ref}^*|$ remains in effect. At $ΔI_F>0$ ($I_F<I_{Fref}$), the amplitude of $U_{ref}$ is decreased somewhat due to $k_F<1$. At $ΔI_F<0$ ($I_F>I_{Fref}$), the amplitude $|U_{ref}|$ is increased due to $k_F>1$. Multiplying by the conditioning factor $k_F$ takes place in a multiplier 12 in the single-phase a.c. system with the voltage reference value $U_{aref}^*$. In the three-phase a.c. system, the conditioning factor $k_F$ is multiplied by the voltage reference values $U_{aref}^*$ and $U_{bref}^*$, in multipliers 12 and 13 respectively.

It is thus guaranteed that regardless of the voltage level at the power supply connection point NA or NA3, the optimum amplitude of the reference voltages is always set. In addition, only harmonics for which $f_h>f_F=1/I_F$ holds (h denotes the order of the harmonic) are corrected.

The conditioned voltage reference value(s) $U_{aref}+$ in the single-phase systems or $U_{aref}+$ and $U_{bref}+$ in the three-phase systems are compared in differentiator stages 14 or 14 and 15 with the measured actual values $U^*_a$ in the single-phase systems or $U^*_a$ and $U^*_b$ in three-phase systems. Using a computation operation, the deviation $ΔU_c=-ΔU_a-ΔU_b$ is formed in a corresponding computation element 16 with the three-phase systems. Depending on the signs (plus or minus signs) of the deviations of the voltage values ΔU, the above-mentioned control pulses (A, B) with the single-phase systems and (A, B, C) with the three-phase systems are generated for the converter valves in a logic unit 30. Thus any measurement or digitization errors in the actual voltage values U are of subordinate importance as long as they do not generate any systematic errors. The logic unit 30 may be implemented in the form of discrete logic gates but also in the form of a suitably programmed ASIC unit or a suitably programmed microprocessor or digital signal processor.

As described above, there are two meaningful control states (A, B) in the single-phase systems, and there are six meaningful voltage states (A, B, C) in the three-phase systems. Each voltage state ΔU is thus unambiguously correlated with a switching state of the converter valves. Table 1 lists the required converter control signals in three-phase systems.

TABLE 1

| State | Valve Control | | |
|---|---|---|---|
| $U_a<U_{aref}$, $U_b<U_{bref}$, $U_c>U_{cref}$ | A+:=ON, | B+:=ON | C+:=OFF |
| | A-:=OFF, | B-:=OFF | C-:=ON |
| $U_a>U_{aref}$, $U_b>U_{bref}$, $U_c<U_{cref}$ | A+:=OFF, | B+:=OFF | C+:=ON |
| | A-:=ON, | B-:=ON, | C-:=OFF |
| $U_a<U_{aref}$, $U_b>U_{bref}$, $U_c<U_{cref}$ | A+:=ON, | B+:=OFF, | C+:=ON |
| | A-:=OFF, | B-:=ON | C-:=OFF |
| $U_a<U_{aref}$, $U_b>U_{bref}$, $U_c>U_{cref}$ | A+:=ON, | B+:=OFF, | C+:=OFF |
| | A-:=OFF, | B-:=ON, | C-:=ON |
| $U_a>U_{aref}$, $U_b<U_{bref}$, $U_c>U_{cref}$ | A+:=OFF, | B+:=ON, | C+:=OFF |
| | A-:=ON, | B-:=OFF, | C-:=ON |
| $U_a>U_{aref}$, $U_b<U_{bref}$, $U_c<U_{cref}$ | A+:=OFF, | B+:=ON, | C+:=ON |
| | A-:=ON, | B-:=OFF, | C-:=OFF |

The converter valves are to be driven permanently as long as the respective state is valid. With a change in line voltages, the converter valves are to be driven according to the state valid thereafter. Thus, it must be possible to change from any one state into any other. The switch to a new state takes place when both the corresponding voltages fulfill the respective conditions and the minimum waiting time $T_{min}$ has elapsed. However, it must be ensured that in contrast with the conventional control logic gates, at least two converter valves are switched on here at the same time (a maximum of two converter valves in a circuit with a capacitance on the d.c. side) with each change in switching state ($I_F$ commutation from one complementary pair of converter valves to the next).

For the single-phase system, the required control pulses (A, B) for the voltage overshoot are: A+=OFF, A−=ON, B+=ON, B−=OFF. When there is the voltage deficiency, the control pulses are: A+=ON, A−=OFF, B+=OFF, B−=ON.

Additionally, measures for preventing damage when the filter current $I_F$ is exceeded above a certain maximum $I_{Fmax}$ and when operating voltage $U_B$ drops below a minimum $U_{Bmin}$ can be taken into account. It is guaranteed that at $I_F>I_{Fmax}$ and $U_B<U_{Bmin}$, the converter valves of a complementary branch are switched on until filter current $I_F=0$.

In addition, three emergency function levels are conceivable. With only a slight overshoot in the filter current $I_F$ ($I_F>I_{Fmax1}$) the amplitude $|U_{ref}^*|$ is further increased by directly applying a higher conditioning factor $k_F$ and thus the filter current $I_F$ is reduced. With a definite overshooting of $I_F$ ($I_F>>I_{Fmax1}$), the logic of the automatic state machine 30 described above is inverted to supply the control pulses (A, B) or (A, B, C). Although this worsens the filter characteristic, it reduces the filter current $I_F$ to an adequate extent. If the filter current $I_F$ exceeds the maximum allowed value, i.e., it enters the range of saturation of the filter inductance $L_F$ ($I_F>I_{Fmax2}$), two complementary converter valves (e.g., A+ and A−) are switched on at the same time by a binary alarm signal generated by a threshold switch 41 coupled to the $I_F$ signal, so the filter is disconnected from the system and the filter inductance $L_F$ is short-circuited until the filter current $I_F=0$. For $U_B<U_{Bmin}$, the same thing holds as for $I_F>I_{Fmax2}$, with another threshold switch 40 provided for this purpose. The emergency functions described here are implemented by a suitable logic unit 25, shown in the diagrams in FIGS. 3 and 4.

The function principle described here ensures that the active filter can be operated mostly automatically throughout the world in any system, regardless of the voltage level, frequency (50 or 60 Hz) and direction of rotation in the three-phase systems. It automatically responds to fluctuations in line frequency with a delay in line period (recognized by determining the zero crossings). It responds automatically to fluctuations in line voltage amplitude and changes in operating conditions by analyzing the filter current $I_F$. The operating principle is suitable for converting any voltage form existing at the power supply connection point NA or NA3 to any other desired sinusoidal or non-sinusoidal voltage form.

The following conditions should be maintained: the energy balance between the actual a.c. voltage characteristic U and the reference a.c. voltage characteristic $U_{ref}$ must be satisfied (i.e., the sum of all positive $\Delta U$ must be equal to the sum of all negative $\Delta U$). The dimensioning of the power electronic elements and the storage components of the control part S or S3 must be adjusted. The desired reference voltage form must be stored in the control part S or S3, in particular in function generator 11.

In principle, three possible implementations, among others, are available for implementing the circuit arrangements illustrated in the diagrams in FIGS. 1–4.

One implementation features a multichip digital signal processor, i.e., with integrated digital signal processor core with hardware multiplier, with analog-digital converters and hardware logic gates. The advantage consists of the fact that almost all functions can be implemented on a single integrated circuit. This solution is simple, inexpensive, and relatively immune to noise. All functions described above can be implemented either in software or by using hardware modules (logic gates, dimmers, function generators in some cases, pulse width modulators, etc.), which are mostly integrated onto such chips.

Another form of implementation comprises a true digital signal processor and a separate analog-digital converter. Thus, several digital units are required. However, one such variant may be favored for availability reasons or because of stricter real-time requirements.

A third implementation possibility consists of a design consisting of discrete analog components.

The active filter described above as an advantageous exemplary embodiment can filter the line disturbances caused by a series of electric converter drives as part of a numerically controlled machine tool. However, it is also conceivable to use the active filter at a central tapping point such as a factory entrance. All line interferences caused in the factory building can be filtered in this way. The prerequisite for this is a sufficiently large energy storage device. Theoretically, it would also be conceivable to use this centrally at a power plant.

The preceding description of two preferred exemplary embodiments in the field of application of the active filtering of voltages of the electric three-phase or the a.c. power supply system is given for the purpose of illustration. It is not exhaustive. Nor is the present invention limited to the precise form given here, and instead numerous modifications and changes are also possible within the scope of the technical teaching presented above. Two preferred exemplary embodiments were selected and described to illustrate the theoretical details and practical application of the present invention and to enable those skilled in the art to implement the present invention. Numerous preferred exemplary embodiments and additional modifications beyond the problem of filtering voltages in electric power supply systems may be considered, e.g., in electronics. In principle, it is possible to form an a.c. voltage of any actual a.c. voltage characteristic into any reference a.c. voltage characteristic.

The following list of reference notations is provided for convenience:

U actual a.c. voltage characteristic
$U_{ref}$ reference a.c. voltage characteristic
A+, A−, B+, B−, C+, C−converter valves
$I_F$ filter current
$L_F$filter inductance, current storage device
D1–D6 diodes
A, B, Ccontrol pulses
G, G3 generator
L, L3 load
NA, NA3 power supply connection point
$L_N$line inductance
$L_L$load inductance
$C_F$power storage device, capacitance
1 rectifier
2 voltage transformer
3 voltage storage device
4 driver stage
$U_s$operating voltage
6, 7 voltmeter
8 ammeter
$U_a^*$, $U_b^*$ actual voltage values
$U_{aref}^*$, $U_{bref}^*$ conditioned reference voltage values
$k_F$Conditioning factor
sgn($U_{aref}^*$), sgn($U_{bref}^*$) sign in front of reference voltage values
10 synchronization unit
11 function generator
30 automatic digital state machine
40, 41 threshold switch
$ADC_F$analog-digital converter for the filter current
$ADC_a$, $ADC_b$analog-digital converter for the actual voltage values 12, 13 multiplication units
14, 15 differentiator elements
16 computing element
$\Delta U_a$, $\Delta U_b$, $\Delta U_c$ voltage overshoots and voltage shortfalls
$\phi$ phase lag
$\tau$ time constant
21 smoothing element
22 differentiator element
23 inverter and coupling element
24 adder
25 emergency function switching device
A, B, C line phases (generator side)
Mp directly grounded conductor (generator side)
a, b, c line phases (load side)
mp directly grounded conductor (load side)

What is claimed is:

1. A method for shaping an actual a.c. voltage characteristic into a reference a.c. voltage characteristic, comprising the steps of:
   comparing the actual a.c. voltage characteristic to the reference a.c. voltage characteristic;
   storing an excess energy in at least one current storage device if a voltage overshoot exists, the voltage overshoot existing if the actual a.c. voltage characteristic is greater than the reference a.c. voltage characteristic, the excess energy corresponding to a difference between the actual a.c. voltage characteristic and the reference a.c. voltage characteristic;
   providing a deficiency energy from the at least one current storage device if a voltage shortfall exists, the voltage shortfall existing if the reference a.c. voltage characteristic is greater than the actual a.c. voltage characteristic, the deficiency energy corresponding to a difference between the reference a.c. voltage characteristic and the actual a.c. voltage characteristic;
   driving a plurality of converter valves as a function of at least one of the voltage overshoot and the voltage shortfall, the plurality of converter valves being driven at a varying frequency rate via a plurality of control pulses;
   determining at least one actual voltage value of a voltage source;
   determining a current value of a current in the at least one current storage device;
   generating at least one reference voltage value corresponding to the at least one actual voltage value, the at least one reference voltage value being equal to the reference a.c. voltage characteristic;
   conditioning the at least one reference voltage value as a function of a conditioning factor and the current value;
   determining a deviation value by comparing the conditioned at least one reference voltage value to the at least one actual voltage value; and
   providing at least one of the plurality of control pulses to at least one of the plurality of converter valves as a function of the deviation value.

2. The method according to claim 1, further comprising the step of:
   simultaneously activating at least one positive converter valve of the plurality of converter valves and at least one negative converter valve of the plurality of converter valves.

3. The method according to claim 1, further comprising the steps of:
   monitoring the current to detect if the current value is greater than a predetermined current value; and
   if the current value is greater than the predetermined current value, limiting the current by increasing the conditioning factor.

4. The method according to claim 3, further comprising the step of:
   if the current value exceeds the predetermined current value by a predetermined amount, performing at least one of i) inverting the plurality of control pulses for the plurality of converter valves, and ii) simultaneously activating the at least one positive converter valve of the plurality of converter valves and the at least one negative converter valve of the plurality of converter values.

5. The method according to claim 4, further comprising the step of:
   if an operating voltage value is less than a predetermined voltage value, simultaneously activating the at least one positive converter valve of the plurality of converter valves and the at least one negative converter valve of the plurality of converter values.

6. The method according to claim 1, further comprising the steps of:
   smoothing the at least one actual voltage value;
   rotating by a fixed phase angle the at least one actual value;
   differentiating the at least one actual value by determining a plurality of zero passes of the at least one actual voltage value with the rotated at least one actual value; and
   generating the corresponding at least one reference voltage value as a function of the differentiated at least one actual voltage value.

7. The method according to claim 1, further comprising the steps of:
   storing the actual a.c. voltage characteristic in at least one storage element;
   if the voltage overshoot exists, temporarily storing the excess energy in a direct current storage element via a converted current, the converted current being an alternating current converted to a direct current by the plurality of converter valves; and
   if the voltage shortfall exists, supplying the deficiency energy to the at least one storage element.

8. A method for active filtering of an a.c. voltage, the a.c. voltage including an actual a.c. voltage characteristic, comprising the steps of:
   comparing the actual a.c. voltage characteristic to a reference a.c. voltage characteristic;
   storing an excess energy in at least one current storage device if a voltage overshoot exists, the voltage overshoot existing if the actual a.c. voltage characteristic is greater than the reference a.c. voltage characteristic, the excess energy corresponding to a difference between the actual a.c. voltage characteristic and the reference a.c. voltage characteristic;
   providing a deficiency energy from the at least one current storage device if a voltage shortfall exists, the voltage shortfall existing if the reference a.c. voltage characteristic is greater than the actual a.c. voltage characteristic, the deficiency energy corresponding to a difference between the reference a.c. voltage characteristic and the actual a.c. voltage characteristic;
   driving a plurality of converter valves as a function of one at least one of the voltage overshoot and the voltage shortfall, the plurality of converter valves being driven at a varying frequency rate via a plurality of control pulses;

determining at least one actual voltage value of a voltage source;

determining a current value of a current in the at least one current storage device;

generating at least one reference voltage value corresponding to the at least one actual voltage value, the at least one reference voltage value being equal to the reference a.c. voltage characteristic;

conditioning the at least one reference voltage value as a function of a conditioning factor and the current value;

determining a deviation value by comparing the conditioned at least one reference voltage value to the at least one actual voltage value; and providing at least one of the plurality of control pulses to at least one of the plurality of converter valves as a function of the deviation value wherein the reference a.c. voltage characteristic is an ideal undisturbed characteristic of the a.c. voltage.

9. A method for active filtering of an a.c. voltage of at least one phase electric a.c. power supply system, the a.c. voltage including an actual a.c. voltage characteristic, comprising the steps of:

comparing the actual a.c. voltage characteristic to a reference a.c. voltage characteristic;

storing an excess energy in at least one current storage device if a voltage overshoot exists, the voltage overshoot existing if the actual a.c. voltage characteristic is greater than the reference a.c. voltage characteristic, the excess energy corresponding to a difference between the actual a.c. voltage characteristic and the reference a.c. voltage characteristic;

providing a deficiency energy from the at least one current storage device if a voltage shortfall exists, the voltage shortfall existing if the reference a.c. voltage characteristic is greater than the actual a.c. voltage characteristic, the deficiency energy corresponding to a difference between the reference a.c. voltage characteristic and the actual a.c. voltage characteristic;

driving a plurality of converter valves as a function of at least one of the voltage overshoot and the voltage shortfall, the plurality of converter valves being driven at a varying frequency rate via a plurality of control pulses;

determining at least one actual voltage value of a voltage source;

determining a current value of a current in the at least one current storage device;

generating at least one reference voltage value corresponding to the at least one actual voltage value, the at least one reference voltage value being equal to the reference a.c. voltage characteristic;

conditioning the at least one reference voltage value as a function of a conditioning factor and the current value;

determining a deviation value by comparing the conditioned at least one reference voltage value to the at least one actual voltage value; and providing at least one of the plurality of control pulses to at least one of the plurality of converter valves as a function of the deviation value wherein the reference a.c. characteristic is an ideal undisturbed characteristic of an a.c. voltage provided by the at least one phase electric a.c. power supply system.

10. A circuit arrangement for converting an actual a.c. voltage characteristic into a reference a.c. voltage characteristic, comprising:

at least one current storage device storing an excess energy, the excess energy corresponding to a voltage overshoot, the voltage overshoot corresponding to a difference between the actual a.c. voltage characteristic and the reference a.c. voltage characteristic when the actual a.c. voltage characteristic is greater than the reference a.c. voltage characteristic, the at least one current storage device further for providing a deficiency energy, the deficiency energy corresponding to a voltage shortfall, the voltage shortfall corresponding to a difference between the actual a.c. voltage characteristic and the reference a.c. voltage characteristic when the reference a.c. voltage characteristic is greater than the actual a.c. voltage characteristic;

a plurality of converter valves driven at a varying switching frequency rate by a plurality of control pulses, the plurality of valves being driven as a function of at least one of the voltage overshoot and the voltage shortfall;

a first arrangement determining at least one actual voltage value of a voltage source and a current value of a current in the at least one current storage device;

a second arrangement generating at least one respective voltage reference value corresponding to the reference a. c. voltage characteristic as a function of the at least one actual voltage value;

a third arrangement conditioning the at least one reference voltage value as a function of a conditioning factor and the current value; and a fourth arrangement providing the plurality of control pulses to the plurality of converter valves as a function of a deviation between the conditioned at least one reference voltage value and the at least one actual voltage value.

11. The circuit arrangement according to claim 10, wherein the reference a.c. voltage characteristic is an ideal undisturbed characteristic of the a.c. voltage.

12. The circuit arrangement according to claim 10, wherein the current storage device includes an inductive storage device, each of the plurality of converter valves includes a transistor, and each of the second arrangement, the third arrangement, and the fourth arrangement includes at least one of i) a plurality of logic circuits, ii) a plurality of user-specific logic circuits, iii) a programmed microprocessor, and iv) a signal processor.

* * * * *